Figure 1:
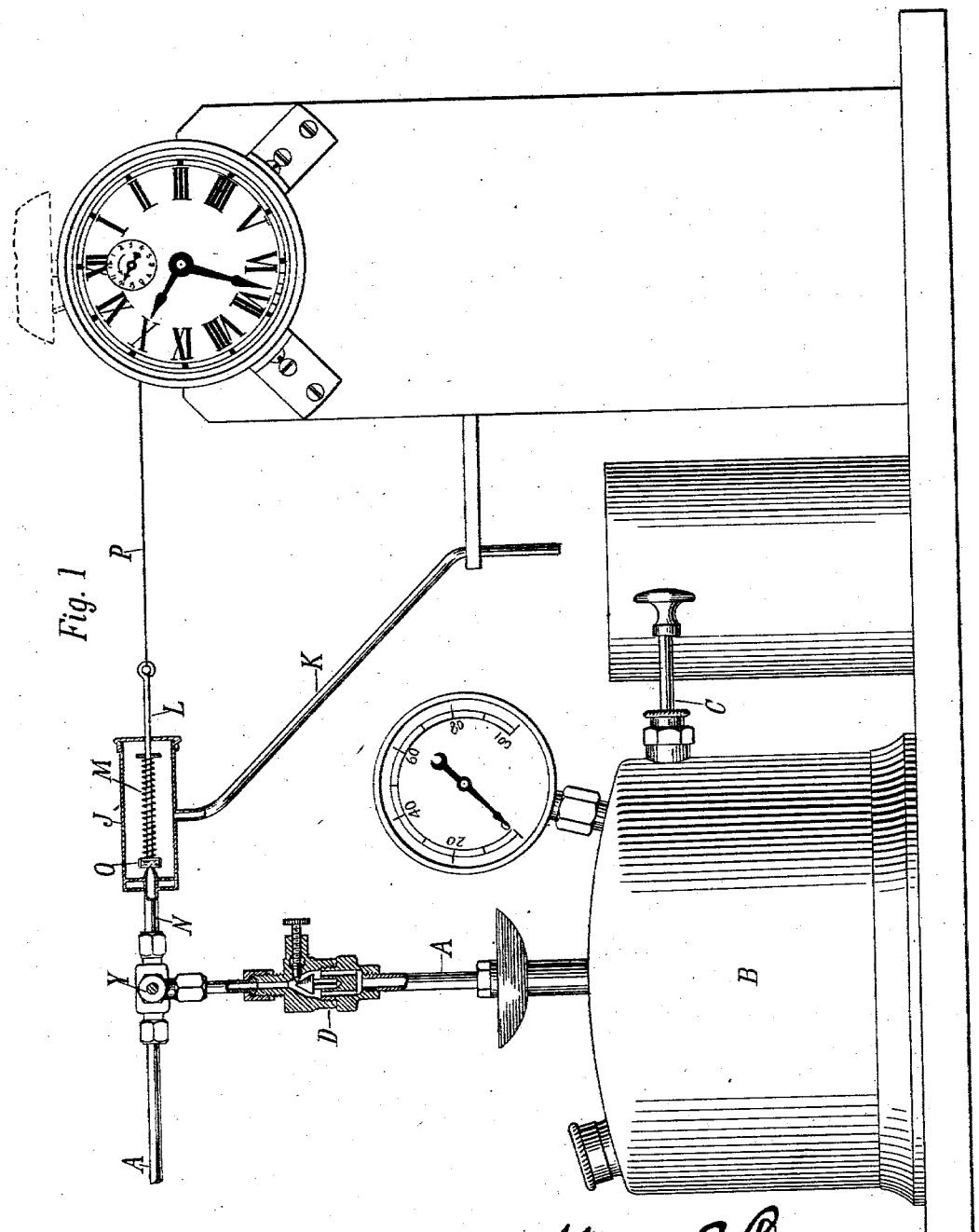

No. 720,939. PATENTED FEB. 17, 1903.
A. E. LOVETT.
OIL SUPPLY CONTROLLING MECHANISM.
APPLICATION FILED JAN. 9, 1900. RENEWED APR. 1, 1902.
NO MODEL. 2 SHEETS—SHEET 2.
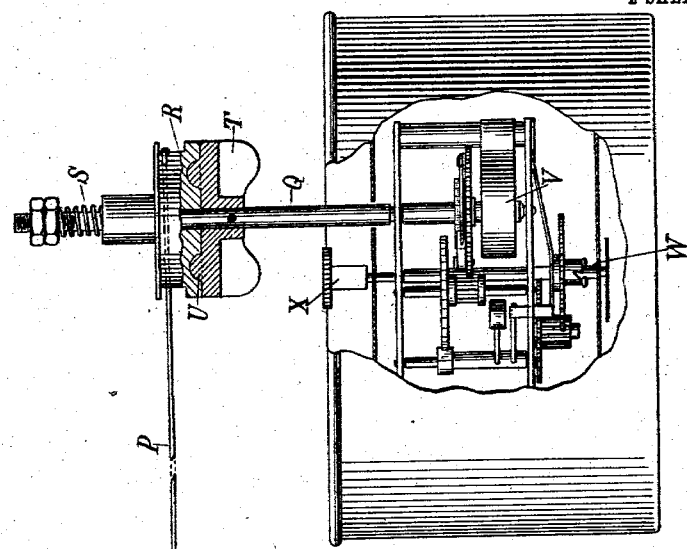
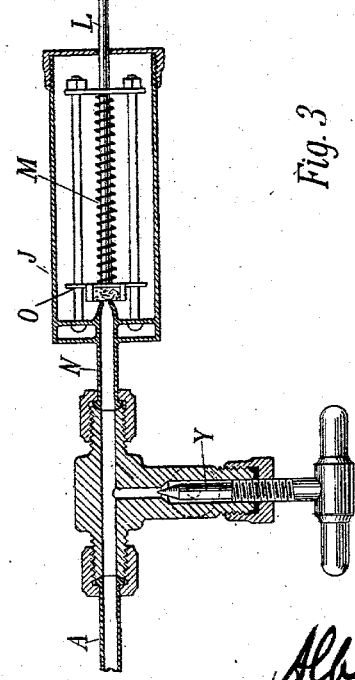
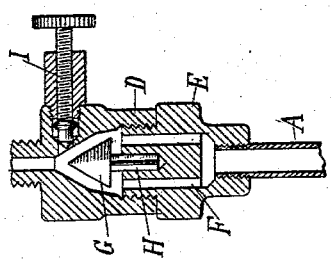
Fig. 2
Fig. 3
Witnesses:
Raphaël Netter
Benjamin Miller.
Albert E. Lovett, Inventor
by Keen, Page & Cooper Attys

UNITED STATES PATENT OFFICE.

ALBERT E. LOVETT, OF JERSEY CITY, NEW JERSEY, ASSIGNOR, BY MESNE ASSIGNMENTS, TO MUNICIPAL LIGHTING COMPANY, A CORPORATION OF NEW JERSEY.

OIL-SUPPLY-CONTROLLING MECHANISM.

SPECIFICATION forming part of Letters Patent No. 720,939, dated February 17, 1903.

Application filed January 9, 1900. Renewed April 1, 1902. Serial No. 100,891. (No model.)

*To all whom it may concern:*

Be it known that I, ALBERT E. LOVETT, a citizen of the United States, residing at Jersey City, in the county of Hudson and State of New Jersey, have invented certain new and useful Improvements in Oil-Supply-Controlling Mechanism, of which the following is a specification, reference being had to the drawings accompanying and forming a part of the same.

There is at the present time in use a form of vapor-burning lamp which is supplied with a hydrocarbon oil from a suitable reservoir or receptacle, where the oil is maintained under sufficient pressure to force it through piping of small diameter to the lamp, in which it is vaporized by the heat of the flame, mixed with air, and burned in contact with an incandescent mantle. These lamps are now commonly known as "incandescent" vapor - burning lamps.

The invention which forms the subject of my present application is an improvement primarily designed for use with the oil-supply pipes of such lamps as a means for controlling the flow of oil thereto, and in the accompanying description of the nature and purpose of the invention it will be described as applied to this special purpose; but the improvement, as will more fully appear from an understanding of its functions, is capable of general application to any other analogous purpose in which the flow of a fluid is to be checked at a predetermined time or automatically interrupted at any time when for any cause its flow exceeds a normal predetermined rate.

The main feature of the invention is an automatic valve which is adapted to be closed by a flow of fluid in excess of a given and predetermined amount and which is placed in the pipe or conduit leading from the oil-reservoir to the lamps or other devices to which the oil may be supplied, in combination, a time-controlled valve mechanism connected with the oil-supply pipe between the above-described automatic valve or other device capable of a similar operation and the devices which use the oil for the purpose of momentarily relieving the pressure in said pipe, and thereby bringing into operation the automatic valve and stopping the flow of oil at any given time predetermined by the proper adjustment of the time controlling device.

These improvements are illustrated in the accompanying drawings, in which—

Figure 1 is a view in elevation of the controlling mechanism, the automatic and time valves being shown in section. Fig. 2 is an enlarged plan view, partly in horizontal section, of the controlling mechanism; and Fig. 3 is an enlarged vertical section of the automatic valve.

A represents a pipe or tube through which oil or other fluid is conducted and supplied to a lamp or other device from a reservoir B, which is maintained at an elevation or provided with any suitable means, such as a force-pump C, for supplying the oil under pressure.

At any desired point in the pipe A, but preferably in a vertical portion of the same close to the reservoir, is located an automatic valve D. This valve is shown in detail in Fig. 3 and has a casing D, united to a base E by screw-threads or otherwise. The base E is provided with a series of perforations F, which afford channels for the free passage of the oil through the valve-chamber. Within the valve-chamber formed by the casing D is the valve G in the form of a cone, with a stem entering a socket in the base E. The upper portion of the valve-chamber is formed as a conical seat for the valve, into which the latter fits snugly when raised or closed, thereby completely shutting off the flow of oil. The valve G by an adjustment of its weight or otherwise is unaffected by the normal flow of oil through the valve-chamber, which is necessary for the supply of the lamp or lamps; but by any flow in excess of the normal amount it is lifted and forced into its seat, where it is subsequently maintained by the pressure of the oil in the reservoir. In order to withdraw the valve from its seat, so as to start the flow of oil, I provide a device which is preferably composed of a threaded stem I with a beveled or pointed end and which enters the valve-casing D at right angles to the casing of the valve, so that when it is screwed or forced into the valve-chamber it will depress the valve, as indicated in Fig. 1. The purpose of this valve mechanism is mainly to shut off the supply of oil automatically at any time that the flow becomes excessive, thus to provide against the escape of oil in the event of any accident or injury to the lamps or supply-pipes.

In many cases it is desirable to shut off the supply of oil to the lamps at a given time in order to extinguish them, and the further improvements which my invention involves are constructed for accomplishing this purpose.

At some point between the automatic valve D and the lamps there is connected to the supply-pipe A a branch N, which enters a chamber J. The orifice of the branch N within said chamber is normally closed by a valve O, carried by a stem L and normally held by a spiral spring M in position to close the said orifice. The stem L is connected by a cord P with a drum R, loosely mounted on a shaft Q and held by a spiral spring S in frictional engagement with a plate T, fixed to the shaft or spindle Q. The engagement of the drum R and plate T may be made more intimate by the use of rounded projections U on one of these members entering correspondingly-formed depressions in the other. The shaft Q is adapted to be rotated by the clock-spring V, which is released by a clock mechanism at any desired time, determined by the adjustment of a tripping-shaft W.

It is not necessary to describe more in detail the mechanism for tripping or releasing the spring V and rotating the shaft Q, as the latter may be attached to or form an extension of the spindle of the alarm mechanism of any ordinary alarm-clock. I have shown a well-known form of such a clock in the drawings, and it will be understood that if the spindle W be turned by the milled head X to set the pointer to a given hour on the alarm-dial the spring V will be released at the time indicated.

The operation of the device when the spring V has been released is as follows: The spindle Q is rotated by the unwinding of the spring and carries with it the drum R, winding up the cord P and drawing back the valve-stem L, which opens the valve O. When the tension of the spring M becomes sufficient, it causes the drum R to slip on the plate T, the spring S yielding sufficiently to allow the projections U to disengage from the recesses in the drum R, so that the latter makes a half-revolution before these projections again engage. This permits the valve O to close, and usually I find it desirable to make spring V of sufficient power to repeat this operation two or three times at least when it has once been released. The opening of the valve O causes a sudden reduction of the pressure in the pipe A, which produces a corresponding flow of oil past the valve G, and this closes the same, and, as above described, when once closed it remains so until reopened by the stem I; but in order to insure the proper action of the automatic valve I prefer, as explained above, so to design the apparatus that the valve O will be opened two or three times in quick succession. The oil which escapes from the supply-pipe N into the chamber J when the valve O is open is conducted off by a drip-pipe K to any convenient receptacle. The supply of oil may be permanently shut off when desired by a suitable cock Y.

It will be understood that the time controlling mechanism is especially adapted for extinguishing a lamp or series of lamps automatically at any given hour and is not affected in any way by the operation of the lamps or the conditions of the pressure in the supply-pipes.

Having now described my invention, what I claim is—

1. The combination with a fluid-supply pipe, of an automatic valve therein which permits a predetermined flow of the fluid, but is closed by an excess of such flow, a valve for relieving the pressure in the supply-pipe, and a clock mechanism for operating the same at any predetermined time, as set forth.

2. The combination with a fluid-supply pipe, of an automatic valve which permits a predetermined flow of fluid, but is operated to shut off the supply by an excess in such flow, a branch from the supply-pipe, a valve normally closing the same, and a time-controlled mechanism for opening said valve and relieving the pressure in the supply-pipe, as set forth.

3. The time-controlled valve mechanism comprising in combination a spring-actuated valve, a rotating drum connected with and adapted to open said valve, a shaft or spindle, means for rotating the same and means for holding the drum in yielding connection with the shaft, as set forth.

4. The combination with a time-controlled rotating shaft, of a winding-drum in frictional engagement therewith, with provision for slip and a spring-controlled valve connected with and operated by the winding-drum, as set forth.

5. The combination with a time-controlled power-driven shaft, of a disk or plate fixed thereto, the winding-drum, a spring operating to hold the drum against the face of the disk, projections on one of these members entering corresponding depressions in the other, and a spring-controlled valve connected with and operated by the winding-drum, as set forth.

6. The combination with a pipe for supplying fluid under pressure, of an automatic valve for shutting off the supply dependent for its operation upon an excessive flow of fluid, a valve for reducing the pressure in the supply-pipe, time controlling mechanism for operating the same and a drip-pipe leading from the said valve and arranged to carry off the fluid which escapes when the valve is opened, as set forth.

7. The combination with a fluid-supply pipe, of a valve connected therewith, a time controlling mechanism for operating the valve and a drip-pipe leading from the said valve and arranged to carry off the fluid which escapes when the valve is opened, as set forth.

ALBERT E. LOVETT.

Witnesses:
M. LAWSON DYER,
DRURY W. COOPER.